(12) United States Patent
Hermansen (10) Patent No.: US 7,562,681 B1
(45) Date of Patent: Jul. 21, 2009

(54) SYSTEM FOR DIRECTING FLUENT MATERIALS AND THE USE OF THE SAME

(76) Inventor: David W. Hermansen, P.O. Box 1, Luning, NV (US) 89420

( * ) Notice: Subject to any disclaimer, the term of this patent is extended or adjusted under 35 U.S.C. 154(b) by 0 days.

(21) Appl. No.: 12/220,601

(22) Filed: Jul. 25, 2008

Related U.S. Application Data (60) Provisional application No. 60/962,305, filed on Jul. 28, 2007.

(51) Int. Cl.
*B65B 1/16* (2006.01)
(52) U.S. Cl. ............................ 141/114; 141/70; 141/98; 141/163; 141/166; 141/231; 141/317; 141/382
(58) Field of Classification Search .................. 141/70, 141/98, 129, 163, 165–166, 231, 313–317, 141/382, 392, 114
See application file for complete search history.

(56) References Cited

U.S. PATENT DOCUMENTS

| | | | | |
|---|---|---|---|---|
| 2,988,368 A * | 6/1961 | Kerr | ............................ | 239/674 |
| 3,552,346 A * | 1/1971 | Garden | ........................ | 141/72 |
| 4,044,921 A * | 8/1977 | Caverly | ...................... | 141/391 |
| 5,108,038 A * | 4/1992 | Palladino et al. | ............ | 239/661 |
| 5,121,775 A * | 6/1992 | McClain | ...................... | 141/83 |
| 5,215,127 A | 6/1993 | Bergeron | | |
| 5,353,851 A * | 10/1994 | Cline | ........................ | 141/256 |
| 5,669,732 A * | 9/1997 | Truitt | ........................... | 405/20 |
| 5,806,576 A * | 9/1998 | Sutherlin | .................... | 141/314 |
| 5,848,625 A | 12/1998 | Ebert | | |
| 5,873,396 A * | 2/1999 | Biebrach et al. | ............ | 141/231 |
| 5,884,878 A | 3/1999 | Eckhardt | | |
| 5,893,260 A * | 4/1999 | McKenna | ..................... | 53/451 |
| 6,085,810 A * | 7/2000 | Castillo et al. | .............. | 141/391 |
| 6,112,504 A * | 9/2000 | McGregor et al. | .......... | 141/114 |
| 6,112,956 A * | 9/2000 | Malone | ........................ | 141/231 |
| 6,145,709 A * | 11/2000 | Hogan et al. | ................. | 141/236 |
| 6,237,309 B1 * | 5/2001 | DeMarco | ..................... | 141/231 |
| 6,269,849 B1 * | 8/2001 | Fields, Jr. | ................... | 141/166 |
| 6,390,154 B1 | 5/2002 | Hall | | |
| 6,431,407 B1 * | 8/2002 | Hogan et al. | ................. | 141/236 |
| 6,553,713 B2 | 4/2003 | Chiu | | |
| 6,598,629 B2 * | 7/2003 | Malone et al. | .............. | 141/231 |
| 6,662,528 B2 * | 12/2003 | Holt et al. | ................... | 141/314 |
| 6,863,094 B2 * | 3/2005 | Ensor | ........................... | 141/10 |
| 6,978,812 B2 * | 12/2005 | Summerville | ............... | 141/316 |
| 2001/0027822 A1 * | 10/2001 | Bertolo | ........................ | 141/66 |
| 2004/0112461 A1 * | 6/2004 | Floore et al. | ................ | 141/231 |

\* cited by examiner

*Primary Examiner*—Timothy L Maust
*Assistant Examiner*—Nicolas A Arnett (57) ABSTRACT

Sandbags are filled with sand with a minimum of manual lifting. A truck has a sandbag filling unit thereon with a large sand hopper. The sand hopper has a sand holding tank underneath with one or more funnels for feeding the sand to sand blowers underneath. One or more compressors drive the sand into one or more hoses that are used to feed the sand into empty sandbags on a first conveyor located in close proximity so that workers can use the hoses to fill empty sandbags thereon. When the filled sandbags reach the end of the first conveyor, other workers would seal the bags. As the filled and sealed bags reach the end of the first conveyor, a second conveyor may be positioned to load the sandbags onto a transporting device or a pallet. One or more large sandbags are dropped into a breach of a levee.

8 Claims, 11 Drawing Sheets

SYSTEM FOR DIRECTING FLUENT MATERIALS AND THE USE OF THE SAME

CROSS REFERENCE TO RELATED APPLICATIONS

This application is related to provisional patent application 60/962,305, filed Jul. 28, 2007, by the same inventor.

BACKGROUND OF THE INVENTION

1. Field of the Invention

The present invention relates generally to the use of fluent materials, and, in particular, relates to the use of fluent materials for use in disasters, emergencies and in other applications, and, in greater particularity, relates to the use of sandbags in large quantities, and to devices for filling, storing, and transporting, and the methods thereof.

2. Description of the Prior Art

It is a well know fact that rivers, streams, lakes, and other bodies of water subject to spring runoff or heavy rains from storms are likely to over flow their banks or breach a levee flooding property nearby. In response thereto, persons will attempt to block the flow of water by sandbagging. Because of a lack of specialized heavy equipment such as large front-end tractor loaders, which is addressed by the present invention, preparing sandbags is usually a hand process involving tedious and physically intensive labor. Someone or something holds the bag open as someone shovels sand into the bag. The bag is sealed, stacked, and then transported to the location where they will be used or stored.

Some prior devices are used for filling multiple sandbags by hand where the sandbags are held in position by unique frames such as shown by U.S. Pat. Nos. 5,848,652 and 5,884,878. These structures are limited and further require manual shoveling of the sand into the bags. The unique frames may be large and difficult to move. Further, U.S. Pat. Nos. 6,390,154 and 6,553,713 disclose uniquely shaped bags for the purpose of building retaining walls, for example, in a levee. To address the problem of moving the sand to the sandbags other than by manual labor, U.S. Pat. No. 5,215,127 shows the use of a conveyor belt feeding two chutes for filling bags held at the bottom thereof. This requires that the bags be moved to a stacking location by hand and further sand must be placed onto the conveyor belt. This problem is then addressed by U.S. Pat. Nos. 4,044,921 and 5,873,396 that show the use of a truck carried hopper filled with sand feeding a single bagging chute. In order to automate the processing of filling sandbags, U.S. Pat. No. 6,237,309 shows a large hopper for feeding sand to screw augers that feed the sand into a bagging area. A continuous source of bagging material is provided thereon wherein an operator can select the weight of the bag. A sealing member cuts and seals the bagging material into a discrete bag of sand. This apparatus requires that the sandbags be manually moved to a stacking area. To further address the problem of moving the filled sandbags, U.S. Pat. No. 6,978,812 discloses a large trailer device having a sand hopper feeding an ascending conveyor belt that drops the sand into multiple chutes for filling of sandbags. Once the sandbags are filled, they are pushed onto a second conveyor belt that moves them to a stacking area.

For levees in danger of breaching or that have broken, typically dump trucks bring in large amounts of gravel, rocks, sand, etc., that are placed in or on the endangered area. The use of conventional sandbags may be insufficient to control water currents eroding banks or breaches.

When wild fires threaten high value structures such as homes, prevention is normally a combination of actions such as combustible material removal such as cutting a fire break line or a buffer zone around the structure(s) and the use of water from fire trucks and/or the use of aircraft having a fire retardant mixture therein for dropping. Because of winds and/or incorrect flight paths and/or difficult terrain for fixed wing aircraft, the fire retardant mixture may miss the target. These devices and methods may be insufficient to address fast moving wild fires because of numerous requirements. Further, fires in high rise structures may be out of reach of conventional fire equipment.

The control of icy conditions is critical in many situations. Typically, a combination of sand and ice melting materials are applied to pavements in many situations. This may involve parking lots, driveways, highways, and runways. Small trucks are fitted with removable hoppers for dispersing sand/salt or dedicated trucks with hoppers with dispersing devices such as are used on major highways. Further, these dedicated trucks also plow the roads of snow before applying the sand/salt materials.

Accordingly, there is an established need for devices for apply fluent materials in situations where large capacity is required to meet the requirements for minimizing manual labor, time and cost.

SUMMARY OF THE INVENTION

The present invention is directed at a system and methods for the use of fluent materials involving preparing fluent material containers, storing of fluent material containers, transporting fluent material containers and the application of material(s) in these containers. The present invention is further directed at a system and method of applying one or more fluent materials onto objects by devices have special functions for the situations involved.

The present invention further provides means for a system of preparing sandbags and levee liners having a minimum of manual labor.

An object of the present invention is to provide a means for rapidly filling sandbags or levee liners and moving them to a location for use or storage with a minimum of physical labor.

It is another object of the present invention to provide a system for providing sandbags or levee liners for use in locations remote from a power source or where no power source is available because of outage.

It is still another object of the present invention to provide a means for controlling the flow of a fluent material for use in a variety functions where there is a requirement for applying fluent materials without the need for the use of sandbags or levee liners.

It is yet another object of the present invention to provide means for applying sand and other fluent materials to streets, sidewalks, runways, and other surfaces for the prevention of accidents.

It is a further object of the present invention to provide a means for fighting fires with fluent materials that are applied by means of a directed wind source.

In the present invention, the fluent materials are stored for use, placed in a container for use, transported to a location of use, and applied in the container for the purpose of use. The use may be directed at a potential water emergency such as a flood, at a potential fire emergency such as a forest fire threatening homes or a fire in a high rise structure, and at a potential ice danger such as ice on a road.

In regards to the water emergency, sandbags, larger or small, are filled with sand by the use of a heavy-duty truck having an appropriate electrical power source thereon. The power is supplied to a filling unit. The sandbag-filling unit has thereon a large sand hopper. The sand hopper is so positioned that a large front-end loader can easily dump sand therein. The sand hopper has a sand holding tank underneath with one or more funnels for feeding the sand to sand blowers underneath. One or more compressors drive the sand into one or more hoses that are used to feed the sand into empty sandbags. The hoses have control means on the nozzles that are used to start and stop the flow of sand from the sand holding tanks and sand blowers. A first conveyor may be located in close proximity to the sand blowers so that workers can use the hoses to fill empty sandbags thereon. The conveyor may be mounted on the same trailer or an adjacent trailer. The empty sandbags are attached to sandbag holding units that are portable and are normally placed on the conveyor belt with the bag attached. Different workers are used to attach the empty sandbags to the sandbag holding units. As the conveyor moves, other workers having the hoses would inject the sand into a funnel top on the sandbag holding units. As the filled sandbags reach the end of the first conveyor, other workers would seal the bags with hand-held stitching machines, for example, and attach the sandbag holding units to the same conveyor for return and reuse. As the filled and sealed bags reach the end of the first conveyor, a second conveyor may be positioned to receive the filled sandbags, which would drop them from the first conveyor onto the second conveyor. This second conveyor may be pivoted at that end so that as the filled sandbags reach the opposite end of the second conveyor, they may be selectively dropped onto a truck for transportation to the location of use or a storage facility. The filled sandbags may be placed on conventional pallets in a desired number so that a forklift or similar vehicle may quickly move the sandbags to a desired location. In a further related embodiment, large sandbags may be filled by use of a bulk dry carrier, and transported to the location of use by means of a carrier under a large helicopter, for example. One or more large sandbags are dropped into a breach of a levee.

In a further embodiment, levee liners being elongate containers may be transported to the location of use. Different sizes of levee liner containers may be used as determined by the size of the levee. At the location of use, the containers may be filled and then hoisted onto the levee face and secured thereto or filled after the containers are secured to the levee. The electrical power source and filling unit may be as disclosed with respect to the sandbag use.

Another embodiment of the present invention would provide a means of applying fluent material, which may consist of sand and salt, or other materials, to surfaces that may be slippery from ice, snow, slush, etc., that may be a road surface, a walking surface, a runway surface, etc. One or more hoses may apply the fluent material directly, or a special forced air unit may apply the fluent material with the addition of hot air. A special extension may be added to either unit for removing snow/ice from pavements.

Another embodiment of the present invention provides a means of applying fluent materials such as water, such as a fire retardant with water, or other materials, to fight a forest fire, brush fire, or other fires such as a large building fire in a warehouse, a high rise structure, wherein the fluent materials would be injected into a stream of high velocity air and mixed therein and directed at the fire as appropriate. Further, heated air may be the fluent material with or without additional materials when it is applied to surfaces of objects requiring drying or heating to prevent icing, for example. Further, these fluent materials may be placed in large bags for delivery by aircraft, airplane or helicopter. Further, specialized fluent materials may be used in applying insecticides, fertilizers, and foams, on agricultural targets.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 1A is a view of an electrical power source truck used in conjunction with a filling unit of FIG. 1B and conveyors of FIG. 1C and FIG. 2 to fill sandbags for use in water emergencies as provided for in the present invention;

FIG. 1B is a view of a filling unit for inputting a fluent material into a desired container;

FIG. 1C is an end view of a conveyor used for filling sandbags;

FIG. 2 illustrates by side view a movable conveyor for assisting in loading filled sandbags onto a pallet, for example;

FIG. 3 is a view of a mobile sanding unit mounted to a flat bed truck for use at sites requiring the filling of sandbags, levee liners, etc.

FIG. 4 illustrates placement of levee liners and large sandbags in a levee breach of the present invention;

FIG. 5 illustrates means of delivering fluent materials to a fire by aircraft as detailed in the present invention;

FIG. 6 illustrates means of delivering large sandbags in quantity to a levee breach as detailed in the present invention;

FIG. 7 illustrates an integrated fluent application unit using a flow of air to deliver the fluent material to a desired location for a particular use as detailed in the present invention;

FIG. 8 illustrates an extension unit for placement on the integrated fluent application unit of FIG. 7 to assist in applying fluent materials including hot air, the removal of snow and ice from a pavement surface as detailed in the present invention;

FIGS. 9, 10 and 11 illustrate means for storing fluent containers as detailed in the present invention;

FIG. 12 illustrates a nozzle control for a hose used in applying the fluent materials as detailed in the present invention;

FIG. 13 illustrates a large sandbag of the present invention;

FIG. 14 illustrates a device for filling the large sandbag of FIG. 13;

FIG. 15 illustrates a means for opening the large sandbag of FIG. 13 when air dropped for use on fires; and FIG. 16 illustrates a means for applying fluent materials to a fire of a high rise structure, and further used to rescue persons trapped therein.

Like reference numerals refer to like parts throughout the several views of the drawings.

DETAILED DESCRIPTION OF THE PREFERRED EMBODIMENTS

The present invention is directed at systems and methods for the use of fluent materials involving preparing fluent material containers, storing of fluent material containers, transporting fluent material containers and the application of material(s) in these containers. Further, the present invention is directed at systems and methods for the use of fluent materials in emergencies involving water, fire, or icy conditions.

Figure 1A:
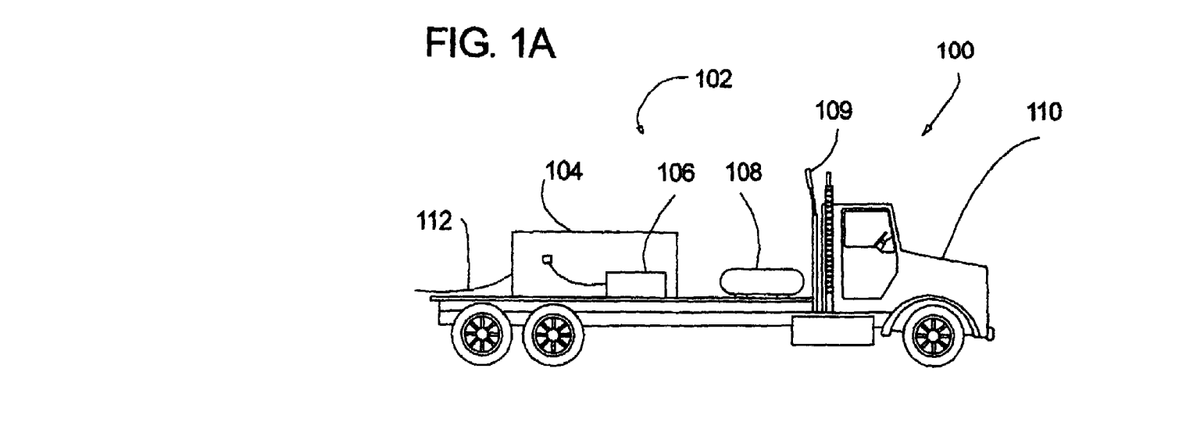
Figure 1B:
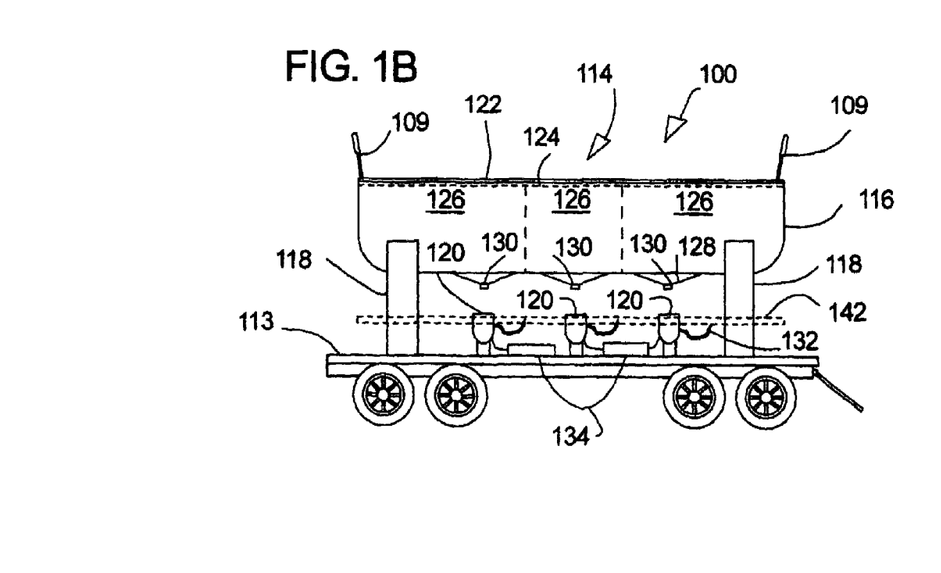
Figure 1C:
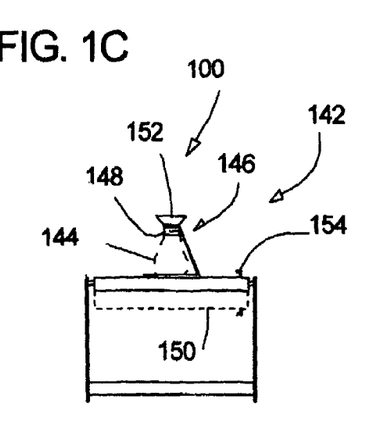

Turning to the drawings, wherein like components are designated by like reference numerals throughout the various figures, attention is initially directed to FIG. 1A to 1C which illustrate as a group a sandbag filling system 100 as detailed according to the present invention.

In the present invention, generally, the fluent materials are stored for use, placed in a container for use, transported to a location of use, and applied in the container for the purpose of use. The use may be directed at a potential water emergency such as a flood of a levee or a levee breach, or at a potential fire emergency such as a forest/brush fire threatening homes and other structures, and at a potential adverse weather condition involving an ice danger such as ice on a road.

In regards to the water emergency, sandbags, being those conventionally used for hand placement, are filled with sand by the use of a system 100, FIG. 1A, that has a transportable electrical source 102 of power. This would include an electric generator 104 with an appropriate motor generator 106 connected to a fuel supply 108 carried on a truck 110. The truck 110 may be a special truck design solely for providing power or have a flat bed attached thereon for the equipment mentioned. Appropriate electrical cables 112 are routed to a sandbag-filling unit 114, FIG. 1B. Appropriate lighting units 109 are attached for use in night work.

Figure 12:
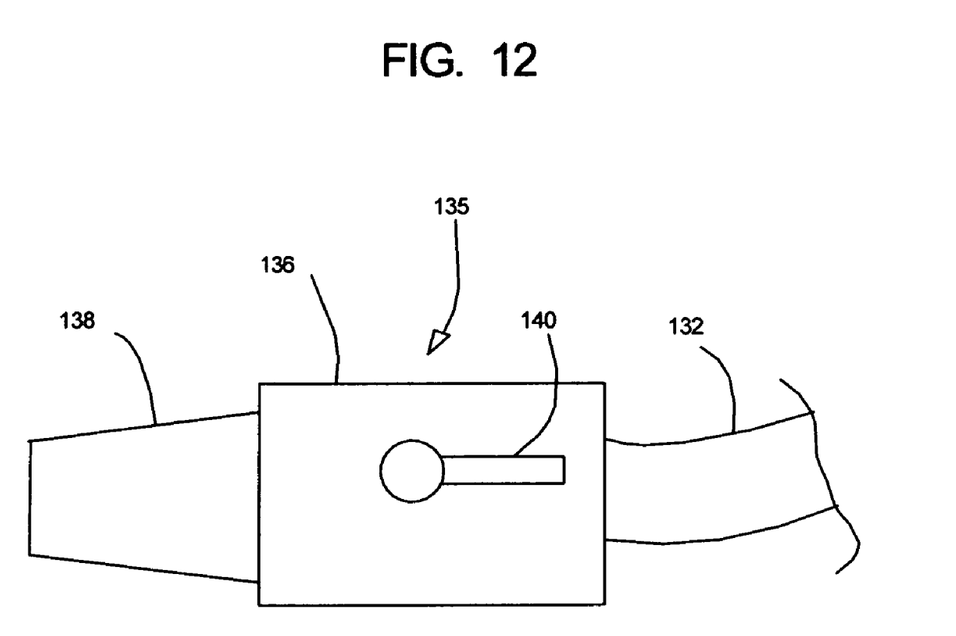

The sandbag filling unit 114 is placed on a flat bed semi-trailer 113 that may be a conventional flat bed trailer and the unit 114 shown may be placed thereon as needed, i.e., the unit is removable from the flat bed trailer. A sand hopper 116 has support legs 118 that elevate the hopper 116 so sand blowers 120 may be positioned thereunder. Three sand blowers 120 are shown and more or less may be used. The sand hopper 116 has a door cover 122 with a screen 124 thereunder shown by a dashed line. A conventional front-end loader, not shown, may be used to load the sand into the hopper 116. Although sand is shown in this preferred embodiment, other fluent materials may be used as will be discussed below. Appropriate screens may be enclosed therein to remove oversized material and separate pieces into smaller pieces. Further, the screen may be vibrated to assist in separating materials. Further, preliminary screening may occur outside the hopper 116 as needed. The hopper 116 has a plurality of sand holding areas or tanks 126, each of which has a funnel 128 thereon. The funnel 128 also includes a control unit 130 to start and stop the flow of sand, not shown in greater detail but considered conventional. The sand flows into sand blower units 120, one located under each funnel, for example. An air compressor 134 is connected into the sand blower unit 120, which blows the sand into a large diameter hose 132. A control nozzle 135 thereon, FIG. 12, is operated by the user and is connected into a control system, not further detailed, for controlling the flow of sand. A control system for use with the present invention is considered to be known to one skilled in the art that would involve the use of switches, relays, and timers. Such considerations as removing sand from the hose is required before shutdown. Therefore, when the operator stops the flow by the control in the nozzle, a valve, not shown in the control unit 130, may close to stop sand from entering the hose 132, but still allows air to flow to dean out the hose 132. FIG. 12 illustrates the control nozzle 134 connected to hose 132. A control body 136 is connected onto the hose 132 at the proximal side and connected to a nozzle 138 on a distal side. A lever 140 may control a blocking flap or door within the body 136 as well as an electrical switch to signal the control system movement of the door therein.

Figure 2:
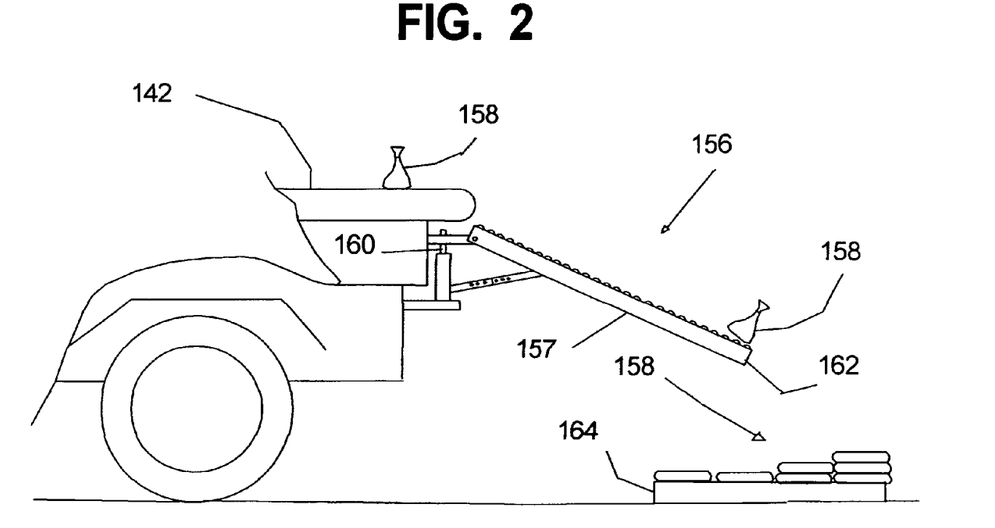

SMALL SANDBAGS Referring back to FIG. 1B, the hoses 132 may be used to fill sandbags, for example, that are placed on an adjacent first conveyor 142, shown in outline therein and further detailed in FIG. 1C. The first conveyor 142 is located in close proximity to the sand blowers 120 so that workers can use the hoses 132 to fill empty sandbags 144 thereon. The conveyor 142 may be mounted on the same trailer or an adjacent trailer. The empty sandbags 144 are attached to sandbag holding units 146, only one shown, that are portable and are normally placed on a continues conveyor belt 150 where the empty sandbag 144 can be attached to a lower funnel 148. Different workers are used to attach the empty sandbags 144 to the sandbag holding units 146. As the conveyor moves, other workers having the hoses 132 would inject the sand into a funnel top 152 on the sandbag holding units 146. As the filled sandbags reach the end of the first conveyor 142, other workers would seal the bags with hand-held stitching machines, for example, and attach the sandbag holding units 146 to the hooks 154, for example, attached to the same conveyor belt 150 for return and reuse. As the filled and sealed bags 158 reach the end of the first conveyor 142, a second conveyor 156, FIG. 2, may be positioned to receive the filled sandbags 158 that would drop from the first conveyor 142 onto the second conveyor 156. This second conveyor 156 may be pivoted at 160 at the proximal end 157 so that as the filled sandbags 158 reach an opposite distal end 162 of the second conveyor 156, they may be selectively dropped onto a truck for transportation to the location of use or a storage facility. The filled sandbags 158 may be placed on conventional pallets 164 in a desired number so that a forklift or similar vehicle may quickly move the sandbags 158 to a desired location for storage or for use. The small sized sandbags 158 may be used in numerous situations where water is presenting an emergency. They may be stacked around a house; they may be stacked along the top of a levee of a river; they may be placed into small breach of a levee; they may be used to channel flooding water; etc. These small sized sandbags 158 are of a weight where they can be lifted by hand as necessary.

Figure 13:
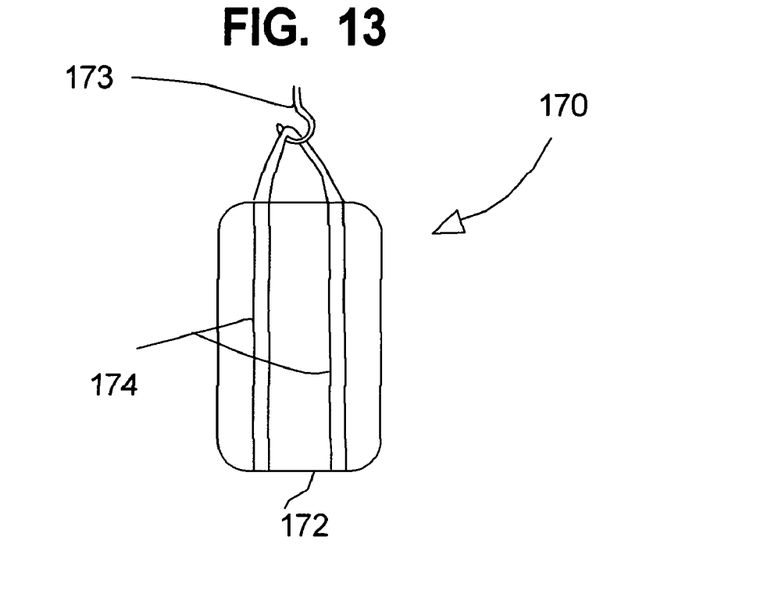
Figure 14:
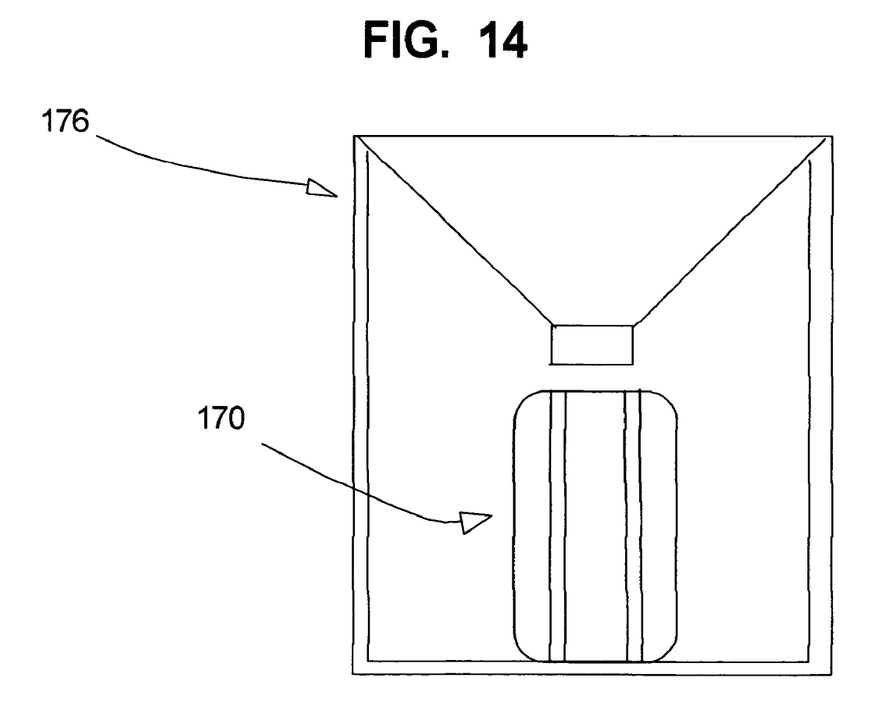

LARGE SANDBAGS In a further related embodiment, large sandbags weighing up to several thousand pounds may used for breach filling. Referring to FIG. 13, a large sandbag 170 being made of heavy plastic sheeting 172 may have one or more nylon straps 174 attached thereto for lifting purposes by a hook 173. These large sandbags 170 may be shaped as a cylindrical bag or a rectangular bag. These large sandbags 170 would be filled in advance of use and stored because of the large amount of material required. Because of the large volume of sand required, filling may be done by use of a conventional bulk dry carrier with pressurized output, a large hopper with a controlled funnel output 176 such as seen in FIG. 14 or by a conveyor belt feed system. After being filled, individual sandbags 170 would be transported to a storage facility such as will be discussed herein. Placement of the sandbags 170 will be discussed herein.

Figure 4:
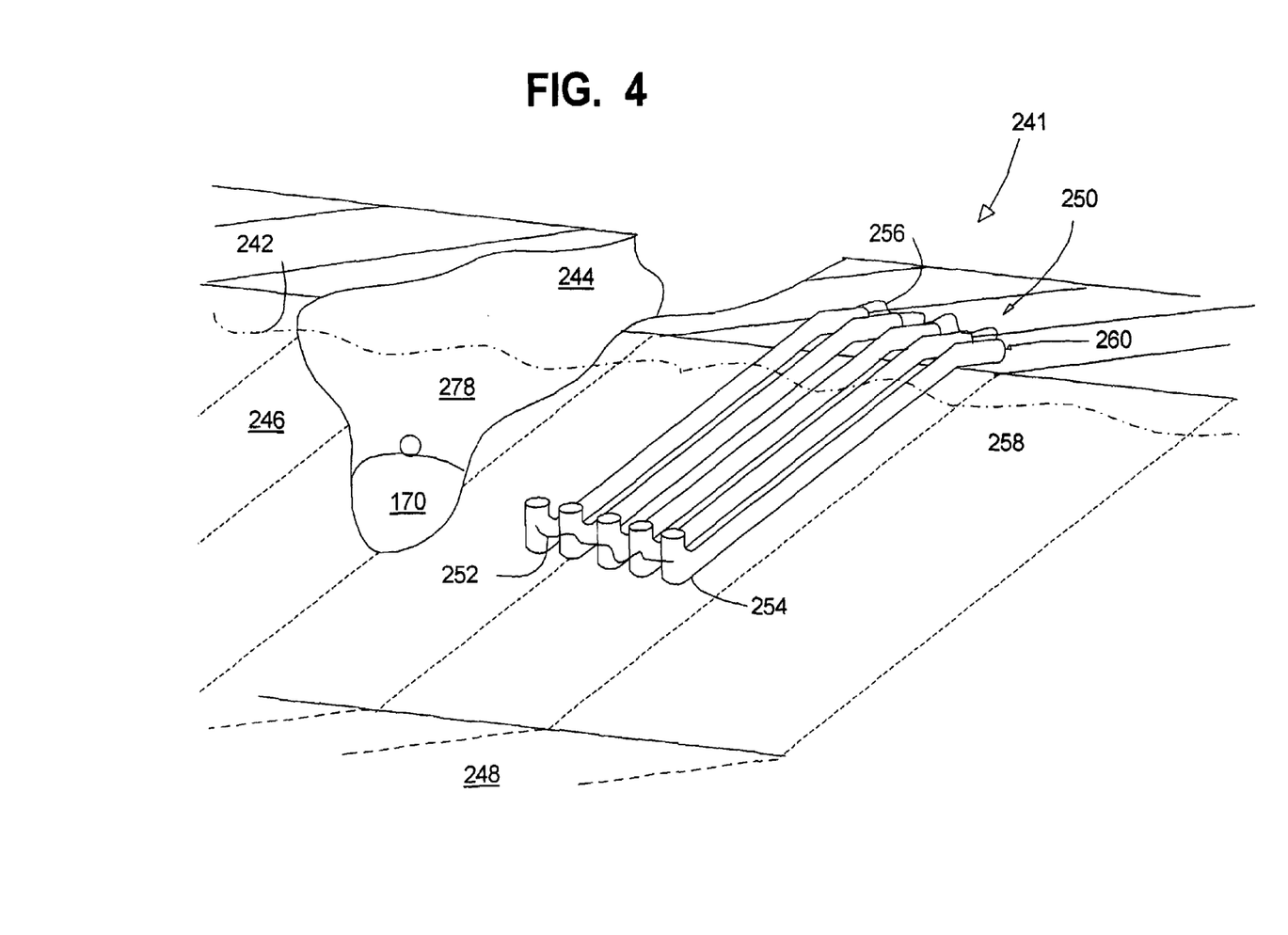
Figure 6:
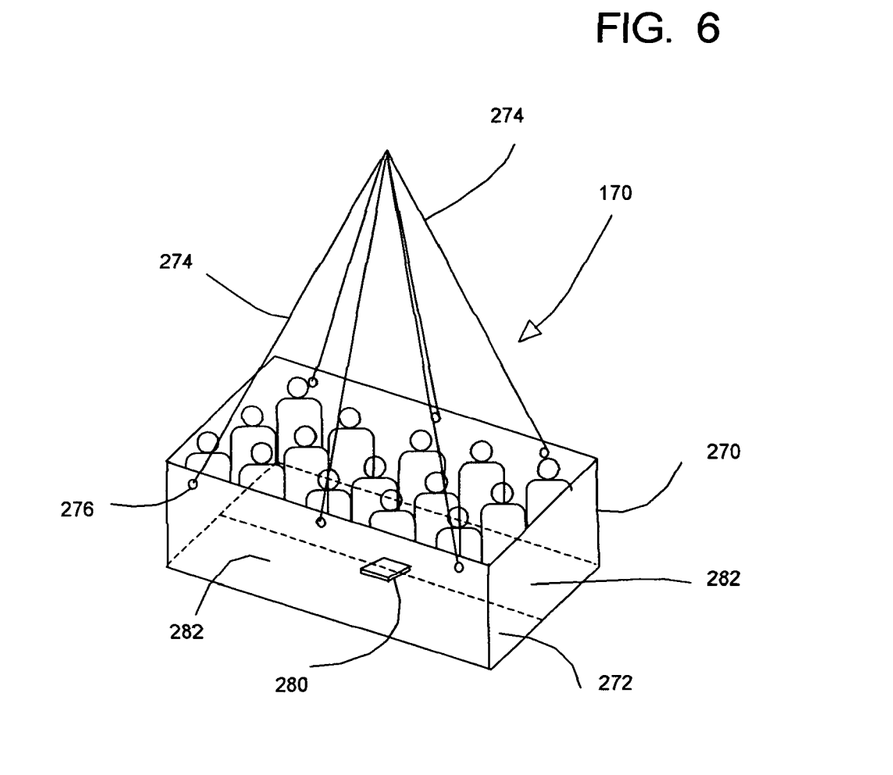

TRANSPORT OF LARGE SANDBAGS AND USE Referring to FIG. 6, a plurality of large sandbags 170 are loaded into a large container 270 having a hinged bottom 272. A plurality of straps 274 secured to the container 270 through eyelets 276 are FIG. 6 attached to a large helicopter, not shown, that transports these sandbags 170 to a breach 278 in a levee 240 as shown in FIG. 4. An electrical-mechanical release 280 allows the bottom doors 282 to open and drop the large sandbags 170 into the breach 278 of command.

Transport of Large Sandbags and Use for Fires

Figure 5:
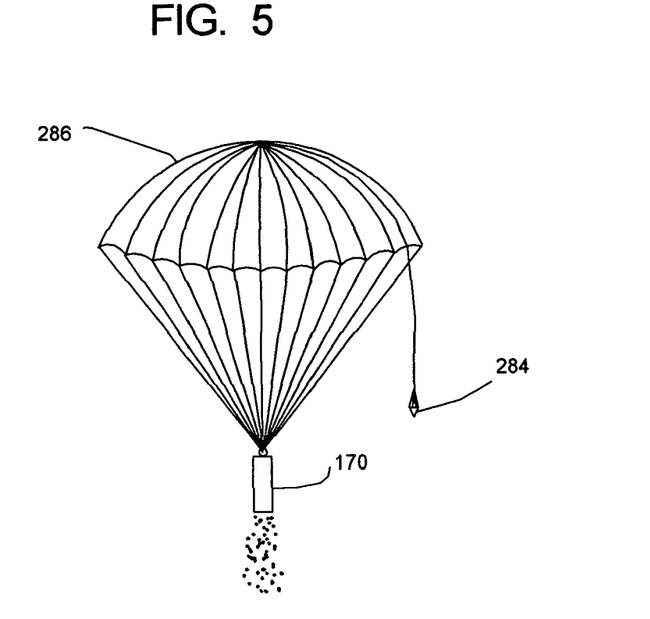
Figure 15:
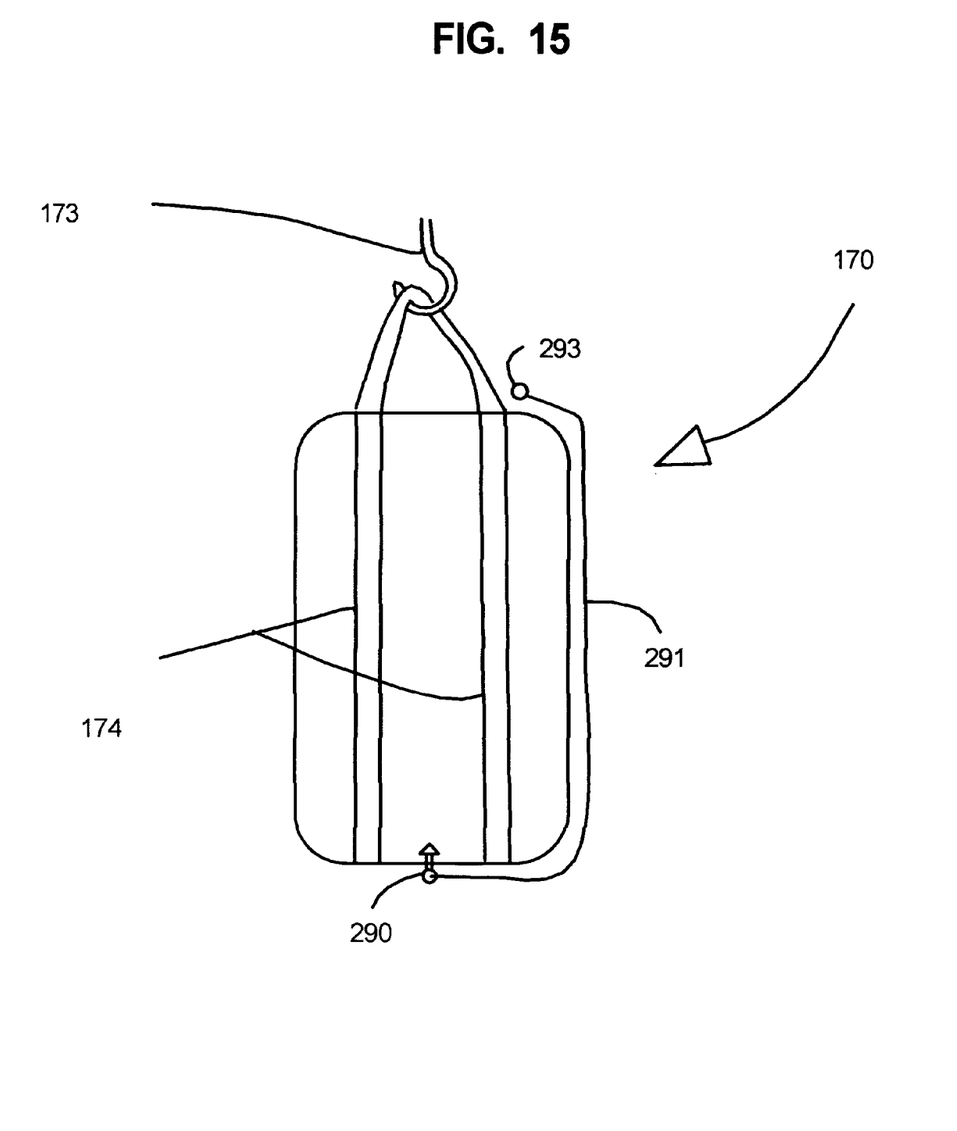
Figure 16:
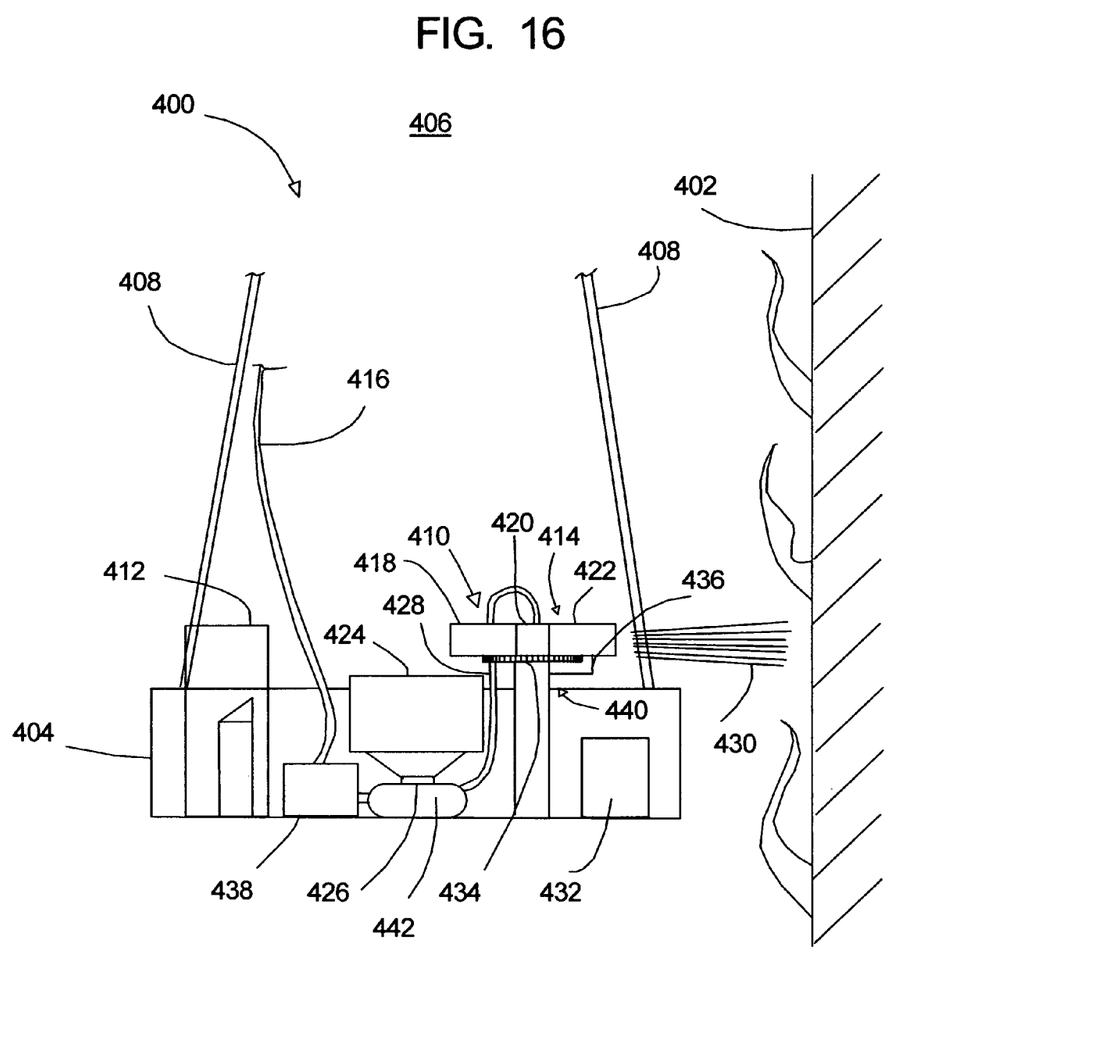

Further, FIG. 5 illustrates the large sandbags 170 being used in the extinguishing of fires such as forest fires and brush fires. The large sandbags 170 are loaded into a large cargo plane such as a conventional C-130 or the like, not shown. After the cargo plane reaches the area of the fire, its rear doors are opened. A drogu parachute 284 is deployed and this in turn pulls a main parachute 286 from the plane. The force of opening of the main parachute 286 drags the large sandbag 170 from the rear drop deck. When the large sandbag 170 falls a cutting device 290, FIG. 15, having a cord 291 attached thereto is inserted into the bottom of the sandbag 170 before deployment. The top of the cord 291 has a loop 293 that is connected to the hook 173. When the sandbag 170 falls, the cord 291 will pull the cutting device 290 along the bottom of the sandbag 170 ripping it open and releasing the fire retardant/sand-fire retardant mixture. The use of a fluid-like water/mixture is not disclosed in detail due to leakage in the plane. Such a use is not impossible with necessary modifications to prevent damage to a conventional C-130 during the transport and deployment of the large sandbags 170.

Figure 3:
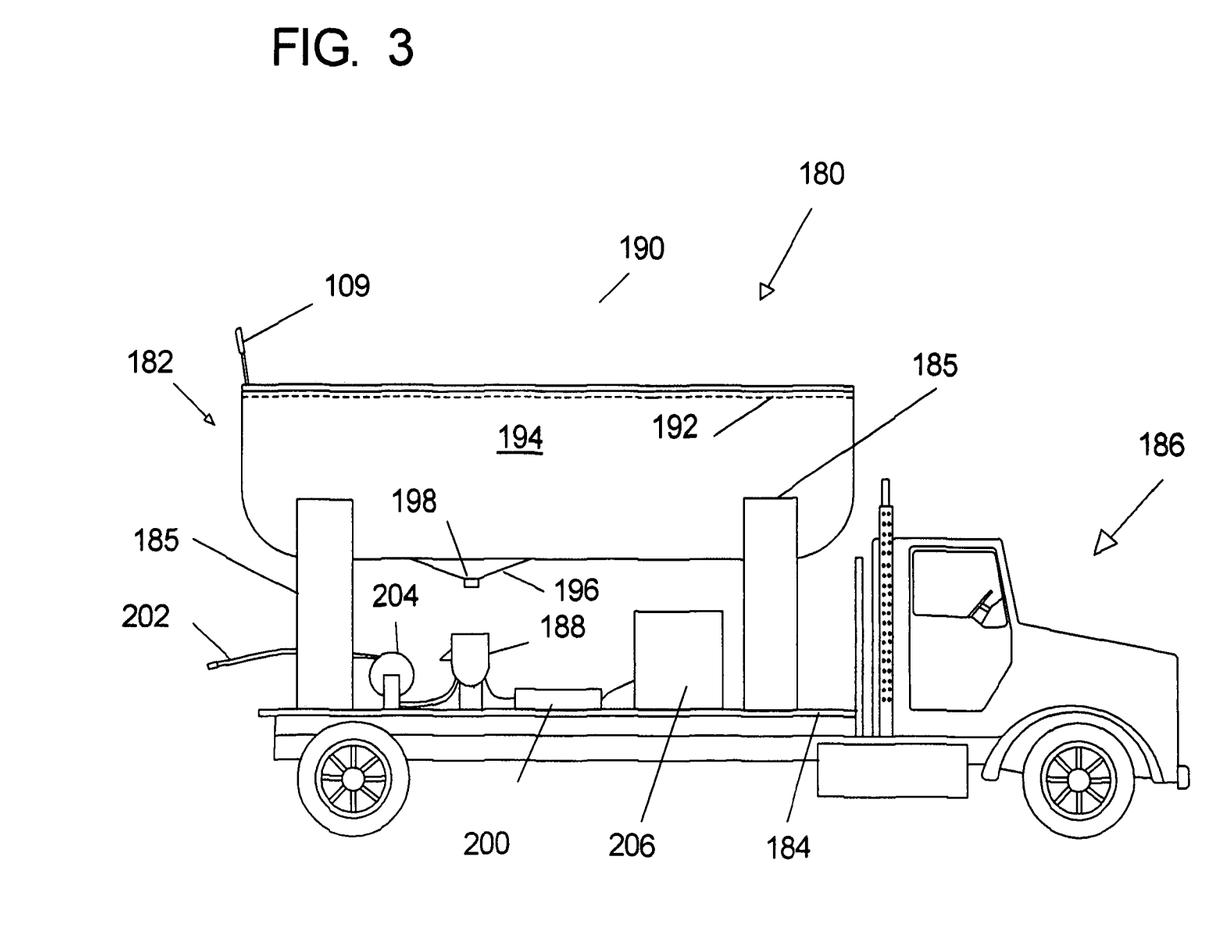

MOBILE SANDING UNIT Referring to FIG. 3, a mobile sanding unit 180 includes a vehicle for carrying a hopper 182 placed on a flat bed 184 of a truck 186. The features of the mobile sanding unit 180 are similar to the sandbag filling system 100 as shown in FIGS. 1A and 1B. The sand hopper 182 has support legs 185 that elevate the hopper 182 so one or more sand blowers 188 may be positioned thereunder. The sand hopper 182 has a door cover 190 with a screen 192 thereunder shown by a dashed line. A conventional front-end loader, not shown, is used to load the sand into the hopper 182. Although sand is shown in this preferred embodiment, other fluent materials may be used such as a combination of sand and ice melting materials such as salt or a fire retardant mixture. Appropriate screens may be enclosed therein to remove oversized material and separate pieces into smaller pieces. Further, preliminary screening may occur outside the hopper 182 as needed. The hopper 182 has one sand holding area or tank 194 that has a funnel 196 thereon. The funnel 196 also includes a control unit 198 to start and stop the flow of the fluent material, not shown in greater detail but considered conventional. The fluent material flows into sand blower unit 188. An air compressor 200 is connected into the sand blower unit 188, which blows the sand into a large diameter hose 202 that may be partially coiled around a hose drum 204. Power is provide by generator 206. A control system for use with the present invention is considered to be known to one skilled in the art. The fluent material may be applied directly to surfaces such as sidewalks.

Figure 9A:
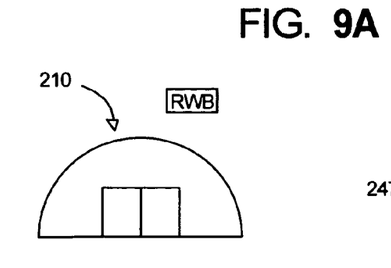
Figures 9B, 10:
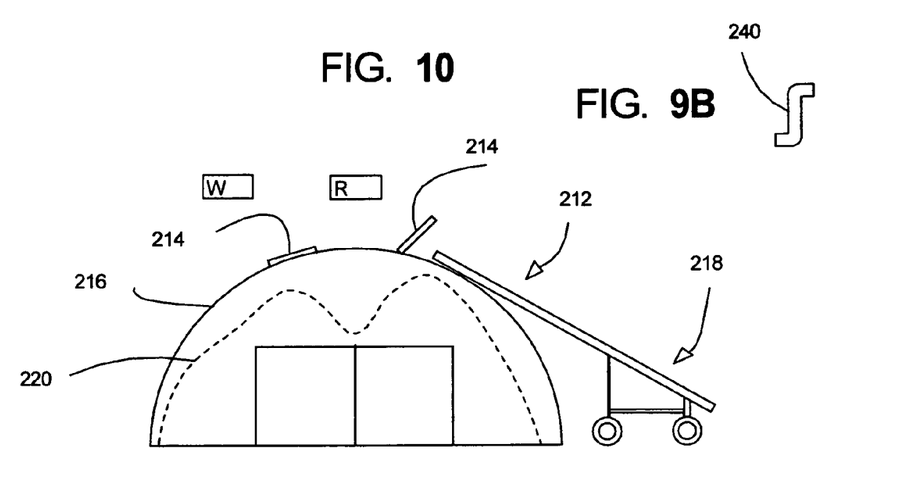
Figure 11:
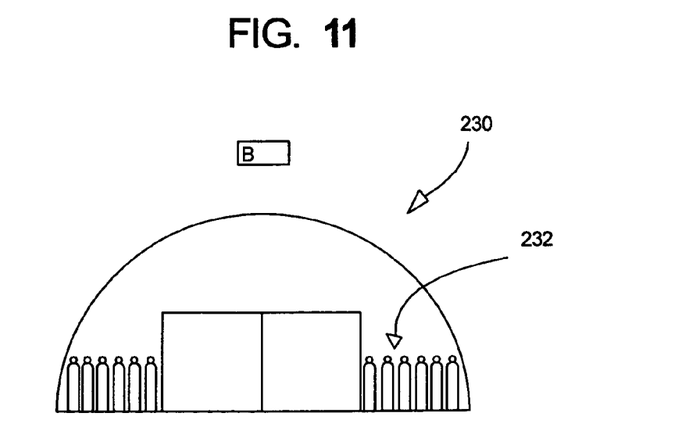

STORAGE In order to be prepared for these emergencies, it is best to have the fluent materials stored and/or have the filled sandbags stored. Because of the large numbers required for small sandbags, storage outside may be required in addition. FIGS. 9A, 10 and 11 illustrate different storage means for the present invention. FIG. 9A schematically illustrates a typical quonset hut or building 210 being half-moon shaped and made of corrugated steel. A further feature of the present invention allows the buildings to be painted on the outside to mark the type of materials therein. For example, a red-white-blue painted top may indicate storage of processed sand for use in water, fire or ice emergencies. The use of the word "emergency" should be broadly interpreted to cover situations from applying sand to a sidewalk having ice to filling a breach of a levee. FIG. 10 illustrates schematically a modified quonset hut 212 having doors 214 in the roof 216 to allow fluent materials to be feed into the hut 212 for storage. Clearly, a conventional elevator conveyor belt feeder 218 would be used. Fluent materials such as sand and ice melting material such as rock salt or fire retardant materials would be mixed before storage. A front-end loader would remove the fluent materials 220, indicated by a dashed line therein, from the huts and place them into dump trucks or bulk dry carriers for transporting to the location of use where sand hoppers may be further used to fill sandbags or liners. The hut 212 would be painted White for sand and ice melting material or Red for fire retardant material or a mixture of sand and fire retardant materials, for example. FIG. 11 schematically illustrates a quonset hut 230 for the storage of large sandbags 232 therein. These large sandbags 232 would normally be filled and stored before use because of their size and the immediate demand for their use such as in filling a levee break. The quonset hut 230 would be painted Blue, for example. As noted above, these large sandbags 232 may weigh up to several thousands pounds. Filling of these sandbags 232 would require a large volume of sand which could be provided by use of a bulk dry carrier having a pressurized output hose. These carriers are conventional in design and carry many fluent products such as cement, feed, etc.

Figure 9C:
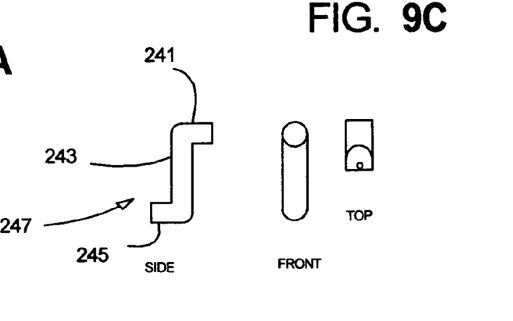

LEVEE LINERS Referring to FIGS. 9B and 9C, FIG. 9B illustrates a small size levee liner 240, and FIG. 9C illustrates a large size levee liner 247. As seen therein, a top 241 may be angled from the main body 243 so as to rest upon the top of a levee. A bottom 245 is also angled from the main body 243 so as to prevent rolling of the levee liners. These levee liners are constructed of PVC material, for example, and have diameters from about 6 inches to 12 inches, if cylindrical, for example, and lengths from about 10 feet to 20 feet, for example. They further may be stored in Quonset hut 210. Because of their large size, filling may occur at the location of use so as to minimize transporting heavy objects.

USE OF LEVEE LINERS Referring to FIG. 4, a levee 241 is illustrated having a high water level 242 indicated by the dotted and dashed line. The levee 241 has a flat top 244, a slanting side 246, and a bottom 248. A plurality of large levee liners 250 are positioned along the slanting side 246. A lower restraint cable 252 is connected to the lower ends 254 of the liners 250, and an upper restraint cable 256 is connected to the upper ends 258 to secure the liners together as a unit of protection. The cables may be further secured to the levee by anchors, not shown, but considered conventional. Because of their large size and resulting weight, each liner may be partially filled to submerge the lower ends 254. Once in place, additional sand is input into the top openings 260 from one or more hoses from sand filling units 100 or 180 such as shown or from a bulk dry carrier having pressurized output hoses.

Another embodiment of the present invention would provide a means of applying fluent material, which may consist of sand and salt, or other materials, to surfaces that may be slippery from ice, snow, slush, etc., that may be a road surface, a walking surface, a runway surface, etc. One or more hoses may apply the fluent material directly, or a special forced air unit may apply the fluent material with or without the addition of hot air as will be described herein. A special extension may be added to either unit for removing snow/ice from pavements.

In a further embodiment of the present invention, a means of applying fluent materials such as water, such as a fire retardant with water, or other materials, to fight a forest fire, brush fire, or other fires such as a large building fire in a warehouse or in a high rise structure, is disclosed wherein the fluent materials would be injected into a stream of high velocity air and mixed therein and directed at the fire as appropriate. Further, these fluent materials may be placed in large bags for delivery by aircraft, airplane or helicopter. Further, specialized fluent materials may be used in applying insecticides, fertilizers, foams, on agricultural targets.

Figure 7:
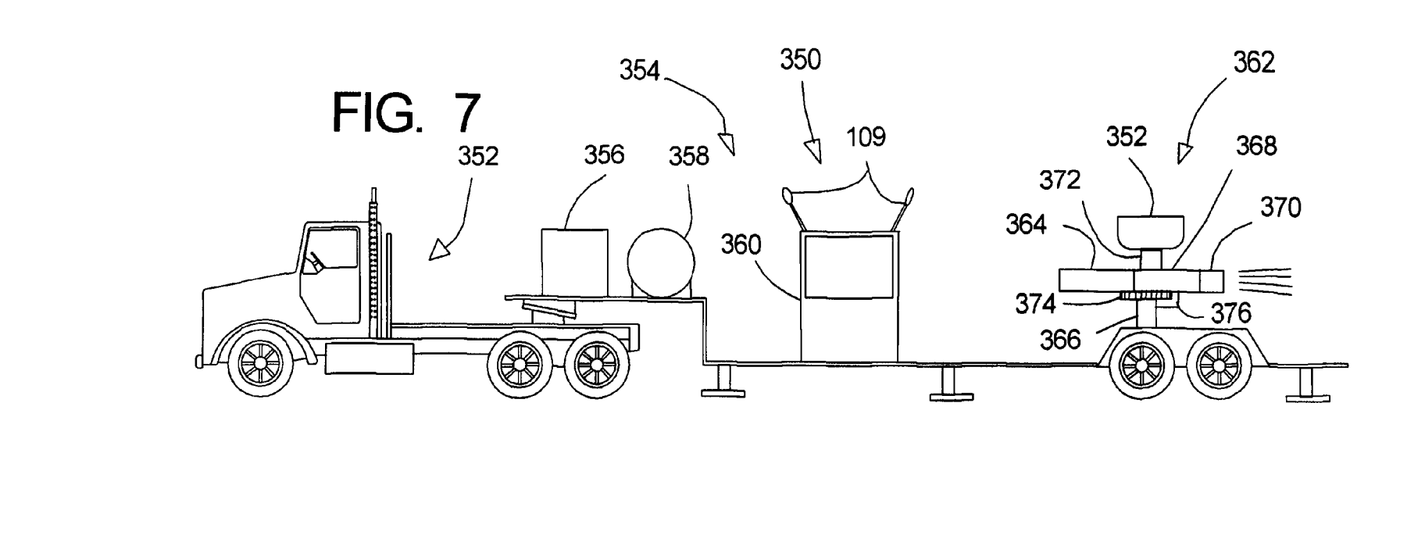
Figure 8:
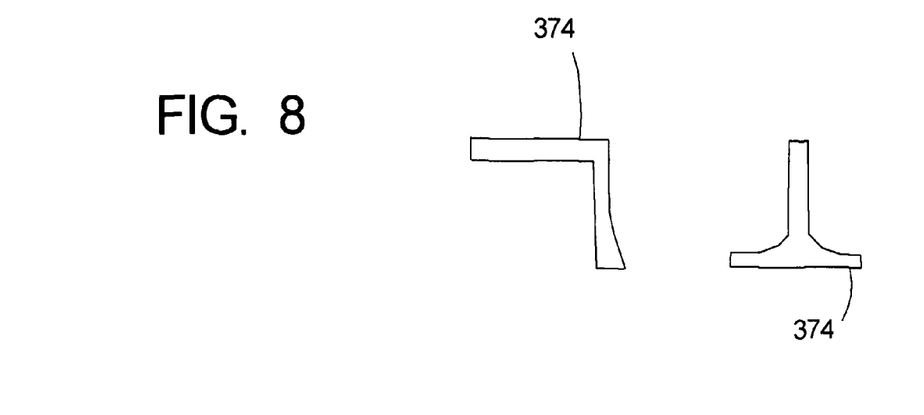

HIGH VELOCITY FLUENT SPRAYER Referring to FIG. 7, an integrated fluent application unit 350 is shown. The application unit 350 comprises a tractor 352 for transporting, a flat bed trailer 354 such as the low bed shown, a power 
generator 356, a fuel source 358, a control center 360, and a high velocity fluent sprayer 362. The control center 360 would monitor power, fuel, level of fluent, operating condition of a high velocity driver 364, and the direction of the sprayer 362, for example. The high velocity driver 364 would be a high velocity fan driven by a gas engine, a small jet engine or a large jet engine coupled to a mixing section 368 with a controllable nozzle 370. A fluent input hopper 352 is mounted to a control unit 372 being coupled to the mixing section 368. Fluent materials may be air, sand, salt, fire retardant, foams, water, etc. The sprayer 362 is mounted on a rotatable base 366 that is controlled by the operator within the control center 360.

The fluent application unit 350 of FIG. 7 is of special interest in the protection of homes and other locations of high value. The output air stream with the desired fluent therein would literal blow the fire out and prevent its re-ignition with the application of the fluent materials. The controllable nozzle 370 may be directed and further restricted in diameter much like an afterburner on a jet for the optimization of the air stream with the mixture therein. It would be dearly advantageous to mount all of the necessary equipment as shown above on a single truck with a flat bed so that it can be immediately moved to a critical location. It is dearly desirable to have all the necessary equipment on the trailer by itself so that it may be pulled by a bulldozer or other appropriately tracked or wheeled vehicle to navigate over rough terrain associated with mountainous areas and to reach fire lines thereon.

The power generator 352 would be of a conventional design to provide the necessary power, voltages both AC and DC as necessary. The fuel source 358 may be gasoline or diesel or JP fuel for jet engines. All of the necessary electrical cables for power, signaling, control, and lines for fuel would be mounted in covered trays under the trailer. The control center 360 would contain the necessary instruments to monitor and control all of the functions of the application unit 350. Further, the control center 360 would be sound proofed and insulated for cold weather operation as necessary. The hopper 352 would be of sufficient size to operate for a sustained period of time, but would be accessible to a front-end loader and even a large bucket carried by a helicopter such as used in delivery of cement in tall buildings. The control unit 372 under the hopper 352 may be a movable plate, not shown, mounted on a shaft geared to a motor outside of the throat through which the fluent materials flow into the mixing section 368 which may a cylindrical tube having the throat mounted in the top thereof. The high velocity driver 364 may be a gas engine, 4, 6 or 8 cylinders, attached to multiple fans to create a sufficient wind source to throw the fluent materials hundreds of feet from the application unit 350. In the case of a small jet engine such as used on a Lear type of jet, or large jet engine such as used on a Boeing 737, the heated exhaust may travel as far as a thousand feet. The rotatable base 366 may consist of a large diameter toothed gear 376 driven by a reversible electric motor 378 having a worm gear thereon.

Other fluent materials may be used as well for other applications. In one application of the present invention, fluent materials such as a mixture of sand and salt or other materials may be loaded into the hopper 352. In the present embodiment, a tractor 352 may pull the trailer 354 along the surface to be treated with the mixture. The surface may be a road, a highway, a runway, a parking lot, or other surface requiring a significant application of a mixture to prevent skidding and melting of the snow/ice thereon. FIG. 8 illustrates an extension unit 374 that may be attached to the nozzle 370 that would direct the high velocity flow onto the pavement surface so as to melt ice/snow, remove ice/snow/water, and leave a treated surface. An exhaust head 374 may be sufficiently wide to treat one traffic lane at a time. For example, the unit may further used to dry large surfaces such as concrete where the fluent material is air or even hot air, or even prevent rapid drying of surfaces such as concrete in hot climates where the fluent mixture is air and water.

In regard to fire emergencies, a high rise fluent applicator unit 400 may be especially suited for distinguishing fires in a high rise structure 402 which is beyond the reach of fire ladder trucks. For example, in FIG. 16, a large container 404 opened topped is attached to a large helicopter 406, not shown, by cables 408. The container 404 may have one side removed partially so that a fluent applicator 410 may be mounted therein. The applicator 410 may comprise a power generator, if power is not provided by the helicopter, a control center 412, and a high velocity fluent sprayer 414. In FIG. 16, a power cable 416 is connected between the helicopter 406 and the applicator 410. The control center 412 would monitor power, fuel, level of fluent, and operating condition of a high velocity driver 418. The high velocity driver 418 would be a high velocity fan driven by a gas engine or a small jet engine coupled to a mixing section 420 with a controllable nozzle 422. A fluent input hopper 424 is mounted to a control unit 426 being coupled to the mixing section 420 by a hose 428. Fluent materials may be a fire retardant, foams, water, etc. The sprayer 414 is mounted on a rotatable base 440 that is controlled by an operator within the control center 412. An output stream 430 with the desired fluent therein would literal blow the fire out and prevent its re-ignition with the application of the fluent materials such as a fire retardant. The controllable nozzle 422 may be directed and further restricted in diameter much like an afterburner on a jet for the optimization of the output stream 430 with the mixture therein. The power generator may be included in the container 404 and would be of a conventional design to provide the necessary power, voltages both AC and DC as necessary. The fuel source 432 may be gasoline or diesel or JP fuel for jet engines. All of the necessary electrical cables for power, signaling, control, and lines for fuel would be mounted therein. The control center 412 would contain the necessary instruments to monitor and control all of the functions of the application unit 400. Further, the control center 412 may be sound proofed and/or insulated for cold weather operation as necessary. The hopper 424 would be of sufficient size to operate for a sustained period of time, but would be accessible to a front-end loader or be fed from a hose from the helicopter having a further supply of fluent material therein. The control unit 426 under the hopper 424 may be a movable plate, not shown, mounted on a shaft geared to a motor outside of the throat through which the fluent materials flow into the fluent blower section 442. A compressor 438 moves the fluent material into the hose 428 and then into the mixing section 420 which may a cylindrical tube having the throat mounted in the top thereof. The high velocity driver 418 may be a gas engine, 4, 6 or 8 cylinders, attached to multiple fans to create a sufficient wind source to throw the fluent materials hundreds of feet from the applicator 410. In the case of a small jet engine such as used on a Lear type of jet, the exhaust may travel as far as a thousand feet. The rotatable base 440 may consist of a large diameter toothed gear 434 driven by a reversible electric motor 436 having a worm gear thereon. Under appropriate conditions, the container 404 may be used to further remove people stranded in the building and provide a means for reaching safety.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for rapidly applying and controlling fluent materials for use in an emergency condition, said system being transportable, said system comprising:
a portable source of electrical power;
a fluent material filling unit, said fluent material filling unit being positionable on means for transporting, said fluent material filling unit being connected to said source of power, said fluent material unit comprising:
a fluent material hopper with one or more holding units with funnels thereon,
one or more fluent material blower units located under said hopper, each blower unit having a hose attached, each fluent material blower unit being located under one of the funnels;
a control unit for starting and stopping the flow of fluent material;
an air compressor for driving the fluent material from each of said blower units into attached hoses to be applied in the emergency condition related to water, fire or ice; a first conveyor system having a belt for transporting bags, said conveyor system located adjacent to said filling unit; a plurality of bag holders, said bag holders being placed on said belt of the first conveyor system, empty bags being removably attached to said holders and filled using the one or more hoses from said system as the belt of said first conveyor system moves the holders for filling of said bags, said first conveyor system placing filled bags in a desired manner; and a stitching unit for closing said filled bags.

2. The system for rapidly applying and controlling fluent materials as defined in claim 1, wherein said fluent materials consists of sand, ice melting material, or fire retardant material.

3. The system for rapidly applying and controlling fluent materials as defined in claim 1, further including means for returning bag holders to a start of the belt of said conveyor system for reuse by one or more workers, said means connected to a belt.

4. The system for rapidly applying and controlling fluent materials as defined in claim 1, further including a second conveyor system having a belt for moving said filled bags to a desired location, said filled sandbag dropping from said first conveyor system onto a belt of said second conveyor system.

5. The system for rapidly applying and controlling fluent materials as defined in claim 1, wherein said system is a mobile unit and positioned upon a single vehicle for providing a source of fluent material for application to remote locations.

6. The system for rapidly applying and controlling fluent materials as defined in claim 5, wherein said fluent material comprises air, sand and a ice melting material for application to surfaces wherein there may be snow and/or ice on said surfaces.

7. The system for rapidly applying and controlling fluent materials in a desired manner as defined in claim 5, wherein said surfaces comprises roads, streets, avenues, highways, runways, parking lots, play grounds, walk ways, or other surfaces having vehicular or human traffic thereon.

8. A system for rapidly applying and controlling fluent materials for use in an emergency condition, said system minimizing physical labor in moving the filled sandbags to a storage area or for use, said system comprising:
a transportable sandbag filling means, said sandbag filling means comprising:
a portable source of electrical power;
a fluent material filling unit, said fluent material filling unit being positionable on means for transporting, said fluent material filling unit being connected to said source of power, said fluent material unit comprising:
a fluent material hopper with one or more holding units with funnels thereon,
one or more fluent material blower units located under said hopper, each blower unit having a hose attached thereto, each fluent material blower unit being located under one of the funnels;
a control unit for starting and stopping the flow of fluent material;
an air compressor for driving the fluent material from said blower unit into one or more hoses for filling sandbags;
a first conveyor system, said first conveyor system comprising:
a plurality of bag holders, said bag holders being placed on a conveyor belt of said first conveyor system, empty bags being removably attached to said holders and filled using one or more hoses as said conveyor belt moves;
a stitching unit for closing said filled bags; and
a second conveyor system for moving said filled bags to a desired location, said second conveyor system being located to receive said filled bags from said first conveyor system.

* * * * *